United States Patent [19]

Rickbeil

[11] 4,388,820
[45] Jun. 21, 1983

[54] CAMBER CORRECTION TOOL

[76] Inventor: Kenneth W. Rickbeil, 227 Poppy, Monrovia, Calif. 91016

[21] Appl. No.: 227,547

[22] Filed: Jan. 23, 1981

[51] Int. Cl.³ .......................... B21D 1/12; B21J 13/00
[52] U.S. Cl. ......................................... 72/458; 72/704
[58] Field of Search ................. 72/704, 705, 386, 387, 72/457, 458

[56] References Cited

U.S. PATENT DOCUMENTS

| | | | |
|---|---|---|---|
| 1,890,935 | 12/1932 | Creagmile et al. | 72/704 |
| 2,597,234 | 5/1952 | Elam | 72/705 |
| 2,939,507 | 6/1960 | Miller | 72/705 |
| 3,481,176 | 12/1969 | Horn | 72/704 |
| 3,501,938 | 3/1970 | Sprague | 72/705 |
| 3,992,919 | 11/1976 | Jarman | 72/705 |
| 4,088,006 | 5/1978 | Patten | 72/705 |
| 4,309,894 | 1/1982 | Connor | 72/705 |

Primary Examiner—Lowell A. Larson
Attorney, Agent, or Firm—Wagner & Bachand

[57] ABSTRACT

Camber corrective adjustment tool having a rigid bar and opposed arms, one of which is fixed relative to the bar, and the other pivoted thereto in a manner to act as a fulcrum relative to the wheel mounting plate, for cooperation with a power unit to flex a trailing arm or McPherson strut suspension element against the weight of the vehicle to correspondingly vary the camber of the wheel coupled to the plate.

10 Claims, 4 Drawing Figures

CAMBER CORRECTION TOOL

BACKGROUND OF THE INVENTION

This invention has to do with a corrective adjustment tool for adjusting camber of a wheel carried on a spindle and mounting plate assembly which is rigidly connected to a camber controlling member such as a trailing arm or McPherson strut. More particularly the invention has to do with improvements in such tools for corrective adjustment of camber without demounting the wheel mounting plate from the vehicle.

Camber is the angular orientation of a wheel to the ground and is determined by the angular orientation of the wheel mounting plate to the ground. The orientation of the wheel mounting plate in turn is controlled by the vehicle suspension. In many instances the camber is incorrect and leads to premature tire wear and possible safety hazard. Adjustment of camber is necessarily precise and involves the reorientation of the mounting plate a very limited distance so as to present appropriate camber of the wheel to the ground. In automotive suspension systems where the wheel mounting plate is attached to a generally tubular support such as a trailing arm or a McPherson strut, adjustment of camber has been difficult. Others have deviced means for adjusting camber for particular suspension systems, but adjusting camber in a suspension system characterized by use of a trailing arm or McPherson strut as the camber determining member is unresolved up to the present invention.

PRIOR ART

Patents considered in connection with the preparation with this application are the following:

U.S. Pat. No. 2,153,867
U.S. Pat. No. 2,256,231
U.S. Pat. No. 2,365,731
U.S. Pat. No. 2,431,291
U.S. Pat. No. 2,572,654
U.S. Pat. No. 2,639,756
U.S. Pat. No. 3,009,506
U.S. Pat. No. 3,481,176
U.S. Pat. No. 4,103,531
U.S. Pat. No. 4,117,709
U.S. Pat. No. 4,178,791

In the development of a corrective adjustment tool for camber correction, it is essential that the tool be easy to use, effective in correcting camber, accurate, relatively inexpensive, and adaptable to a wide variety of vehicle situations.

SUMMARY OF THE INVENTION

The present corrective adjustment tool meets the foregoing criteria and provides in a simple combination of elements a tool which is applicable to camber correction of a wheel mounting plate while attached to a vehicle, by using the vehicle weight as a counterforce to effect adjustment. Advantageously, the present corrective tool applies force to the wheel mounting plate, or the McPherson strut in an appropriate case, and does not rely upon force against the wheel spindle bearings or other elements of the particular suspension which elements are subject to damage if excessive force is used.

Further, the present invention is portable, easily handled by a single operator, adapted to positive or negative camber correction, operable independently of relative height of the vehicle wheels, sturdy and reliable, and adapted for precise, small corrections such as are typically needed in camber adjustment situations.

It is a major objective of the present invention to provide a new and useful camber correction tool. It is a further objective to provide such a tool which is portable, easy to use, precise, convenient, and adaptable to a wide variety of vehicles.

These and other objects of the invention to become apparent hereinafter, are realized in accordance with the present invention in a corrective adjustment tool for adjusting camber of a wheel carried on a spindle and mounting plate assembly rigidly connected to a camber controlling member such as a trailing arm or McPherson strut while attached to a vehicle, in which the tool comprises a rigid bar having in normal operating position, a first terminus remote to the mounting plate, first arm means rigidly connected to the bar first terminus at a fixed angle, and, a second terminus adjacent to the mounting plate, second arm means engageable with the mounting plate and pivotally connected to the bar second terminus in fulcrum defining relation relative to the mounting plate; and force application means adapted to exert spreading or contracting force in parallel with the bar between the first and second arms freely of pressure on the spindle to angularly vary the relative positions of the arms whereby the mounting plate is pivoted about the fulcrum in camber controlling member bending relation against the weight of the vehicle, and camber adjusted thereby.

In particular embodiments, the tool includes a tool base comprising a pedestal having a vertical post, and a bracket carried by the post in tool mounting relation. Typically, the first arm means is fixed at a right angle to the bar, the second arm means is pivotable to extend on either side of the bar at a desired angle, and includes an adapter encircling the assembly spindle in arm means coupling relation to the assembly mounting plate. The tool further generally includes a longitudinally adjustable power device for force application, the arm means defining opposed seats for mounting the device between them parallel to the bar.

In preferred embodiments, there is provided a corrective adjustment tool for adjusting camber of a wheel carried on a spindle and mounting plate assembly rigidly connected to a camber controlling member such as a trailing arm or McPherson strut while attached to a vehicle, the tool comprising:
  a tool base comprising a triangular pedestal and a vertical post, a bracket adjustably mounted on the post carrying the tool horizontally for application to the assembly;
  a rigid bar having in horizontal operating position,
    a first terminus remote to the mounting plate,
      first arm means rigidly connected to the bar first terminus at a fixed right angle, and,
    a second terminus adjacent to the mounting plate,
      second arm means engageable with the mounting plate and pivotally connected to the bar second terminus in laterally offset relation defining a fulcrum for the mounting plate; and
  force application means adapted to exert spreading or contracting force above or below and in parallel with the bar between the first and second arms freely of pressure on the spindle to angularly vary the relative positions of the arms whereby the mounting plate is pivoted away or toward the remote bar terminus about the fulcrum in camber controlling member bending relation against the weight of the vehicle, and camber adjusted negatively or positively respectively thereby.

In the foregoing and other embodiments of the invention, the first arm means typically comprises a U-cross section element, the bar second terminus defines a journal, the second arm means is a U-cross section element sized to overfit the bar second terminus and apertured in registration with the journal, and the tool further includes a pin coupling the bar second terminus and the second arm means element in pivoting relation to extend on either side of the bar at a desired angle. Additionally, the second arm means typically includes an adapter removably secured to the second arms means element beyond a distance defining the lateral offset for encircling the assembly spindle in arm means coupling relation to the assembly mounting plate.

There is further contemplated in the tool, a longitudinally adjustable power device for force application, the device being applicable between the first and second arm means on the same side of the bar for camber adjustment through bending of a trailing arm, and applicable between the first arm and a McPherson strut with the second arm means coupled to the mounting plate on the opposite side of the bar from the first arm for camber adjustment through bending of a McPherson strut by pivoting movement of the mounting plate rigidly coupled between the second arm means and the trailing arm or McPherson strut respectively.

BRIEF DESCRIPTION OF THE DRAWINGS

The invention will be further described in conjunction with the attached drawings in which.

DESCRIPTION OF THE PREFERRED EMBODIMENTS

The present tool is adapted to correction of camber in suspensions in which the camber determining member is a tubular element such as a trailing arm or McPherson strut. To correct camber adjustment it is necessary to deflect the tubular element along its longitudinal axis in a manner that alters the angular orientation of the wheel, or more precisely the wheel mounting plate, relative to the plane of the ground, either to tip the upper portion of the wheel mounting plate inward relative to the vehicle (negative camber adjustment), or to tip the lower portion of the plate inward relative to the vehicle (positive camber adjustment). Camber adjustment is necessitated by vehicle design flaws or by abuse of the suspension by the vehicle operator, e.g. as may result from the vehicle wheel striking curbs.

Figure 1:
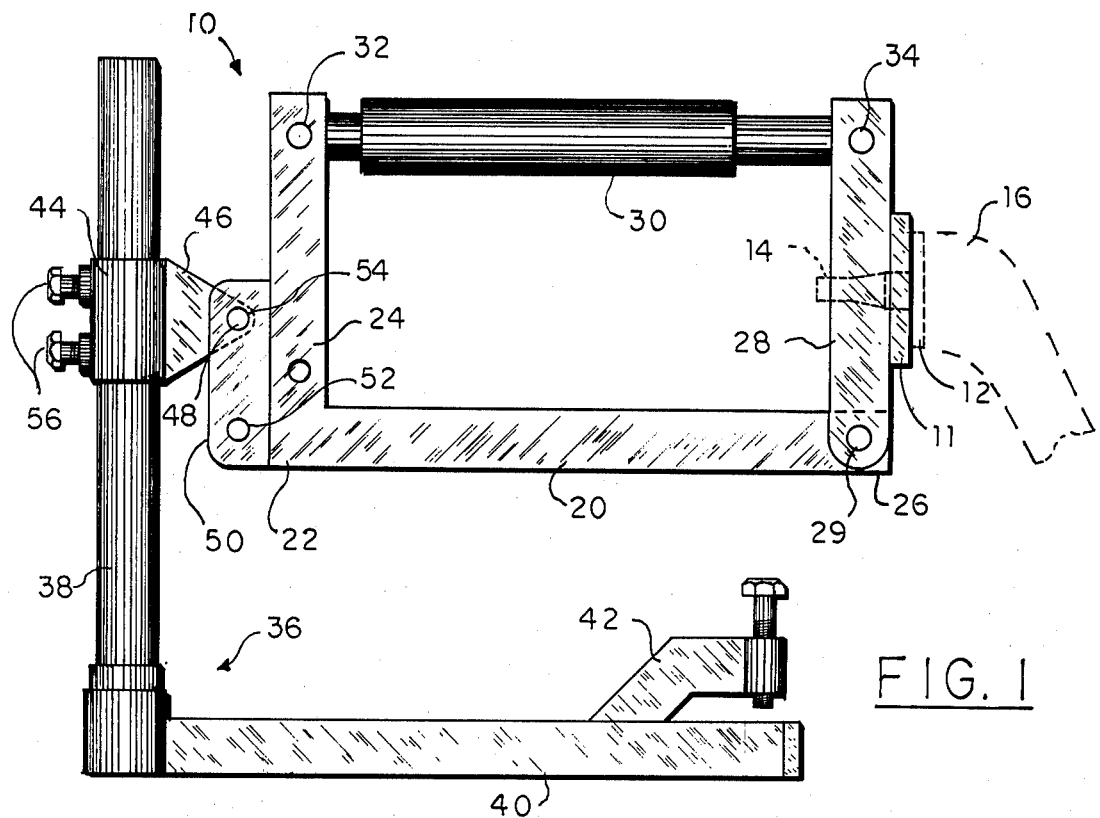
FIG. 1 is a side elevational view of the tool according to the invention, as particularly set up for correcting camber from too positive to a desired more negative condition.
Figure 2:
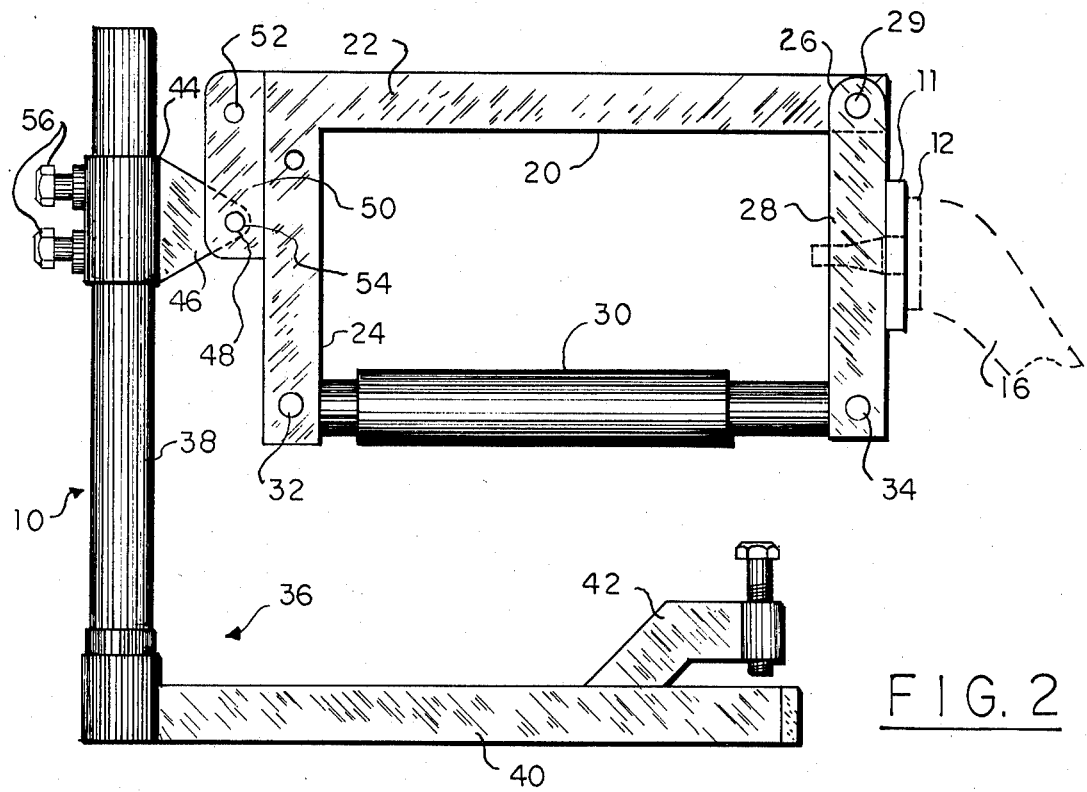
FIG. 2 is a side elevational view thereof, particularly set up for correcting camber from too negative to a desired more positive condition.
Figure 3:
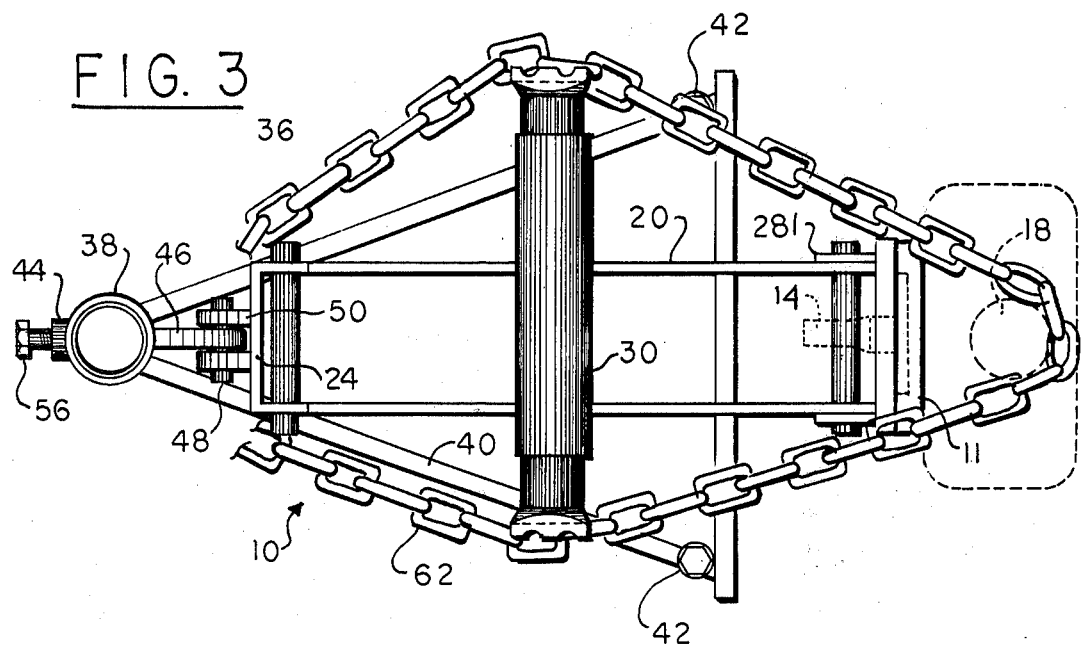
FIG. 3 is a plan view of the invention tool set up for correcting camber in a McPherson strut suspension from too positive to a desired more negative condition.
Figure 4:
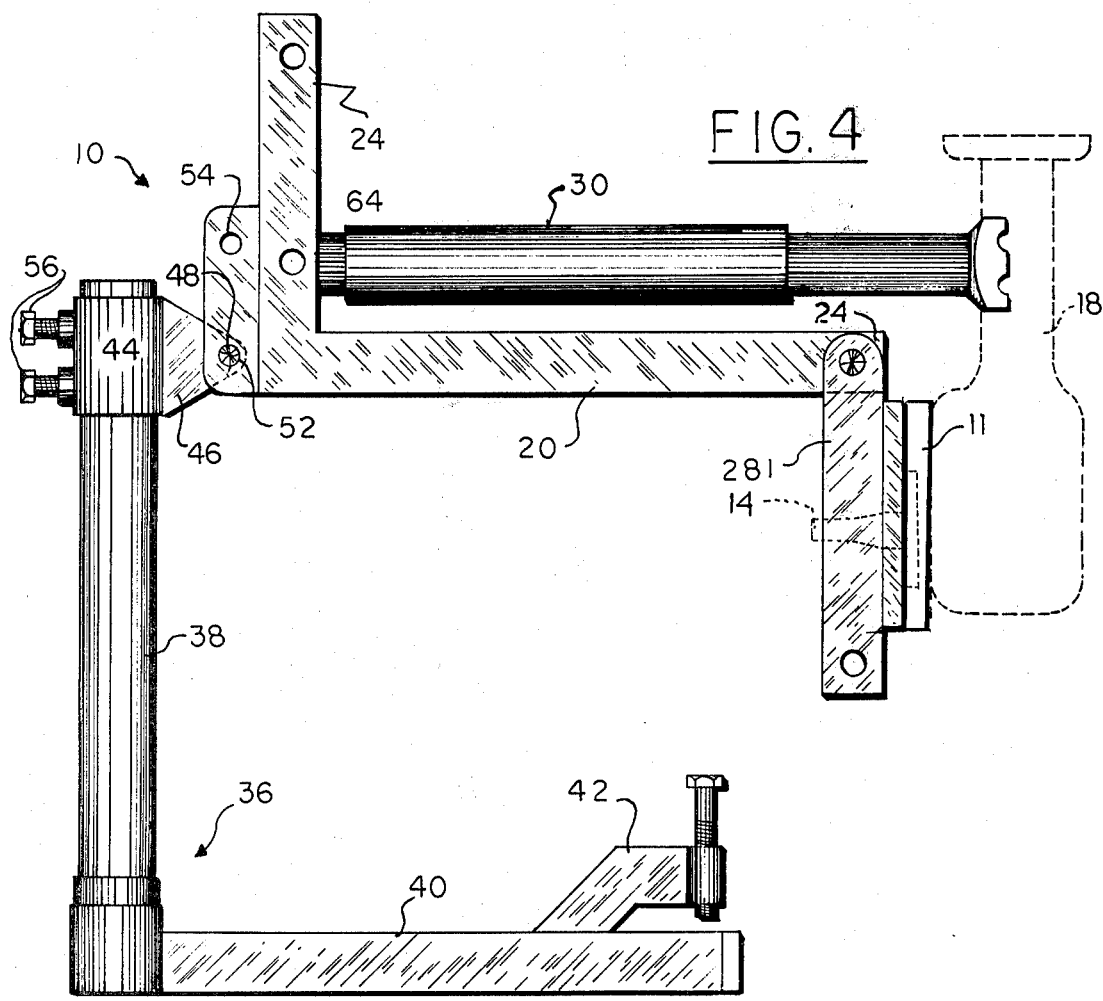
FIG. 4 is a side elevation view of the tool set up for correcting camber in a McPherson strut suspension from too negative to a desired more positive condition.

With reference now to the drawings in detail, the camber corrective adjustment tool is shown at 10 in the FIGURES attached through an adapter ring 11 to wheel mounting plate 12 from which the wheel has been removed, circularly around and freely of engagement with the exposed extent of the wheel spindle 14. It will be particularly noted from the ensuing description that no force is exerted on the spindle 14 bearings as the camber is corrected, which is a signal feature of the present invention. The wheel mounting plate 12 is affixed to the camber determining tubular suspension element which in FIGS. 1 and 2 is a trailing arm 16, and which in FIGS. 3 and 4 is a McPherson strut 18. Adjustment of camber requires precise flexing of the elements 16 or 18, and the invention tool meets this need.

With reference now to FIGS. 1 and 2, the tool 10 is depicted to comprise a rigid bar 20 of U-shaped cross-section and having in its normally horizontal operating position a first terminus 22 remote to the mounting plate 12, and a first arm 24 of U-shaped cross-section rigidly connected to the bar first terminus at a fixed right angle. The bar 20 has a second terminus 26 adjacent the mounting plate 12, and a second arm 28 also of U-shaped cross-section which is engaged with the mounting plate through the adapter ring 11 by a series of bolts (not shown). The second arm 28 is pivotally connected to the bar second terminus by a pin 29 so located relative to the attachment point of the mounting plate to the arm 28 as to define a fulcrum relative to the mounting plate. With reference to FIG. 1, force application by Porta-Power unit 30, by extension between pins 32 and 34 carried at the outer ends of arms 24 and 28 respectively, urges these pins and the arms carrying them thereby relatively apart and the mounting plate 12 to tip relatively inward at top, and outward at the bottom, to effect a change toward the negative in camber of the mounting plate 12, and thus the wheel when remounted thereon. The fixed connection of the remote terminus 22 and arm 24, in conjunction with the plate adjacent terminus 26 pivoted connection to arm 28, translates the spreading between pins 32 and 34 into large forces at the mounting plate 12 through the fulcrum defined at pin 29. Because the plate 12 is fixed to the movable arm 28, arm 28 movement moves the plate. The forces thus exerted on the trailing arm 16 result in flexed distortion of the trailing arm in a manner which results in the camber being corrected proportional to the angular adjustment of the wheel mounting plate 12 by the arm 28 relative to the plane of the ground.

The tool 10 is highly versatile, being easily applicable to a variety of different vehicles by simple adjustments. The bar 20 for this purpose is carried on a pedestal 36 which comprises a normally vertical post 38 and a generally triangular base 40 which supports the post at its apex by interfittment. A screw clamp 42 is provided on each leg of the triangular base 40 for securing the pedestal to a bed, not shown, and against unwanted movement. The bar 20 is adjustable along the post 38 to vary the bar height by means of a slide 44 carrying screws 56, and which defines an ear 46 through which pin 48 extends to journal the bracket 50 fixed to the arm 24 at the remote terminus 22. The bracket 50 has inner and outer openings 52 and 54 respectively, for receiving the pin 48, to enable variation in presentation of the tool 10 to the camber correction situation. In FIG. 1, the outer bracket opening 54 is used to mount pin 48, as shown.

With reference to FIG. 2, the pin 48 is also placed in the outer bracket opening 54, but the bar 20 is inverted as shown. The second arm 28 now depends from the bar 20, but is still fixed to the mounting plate 12 by means of adapter ring 11 and bolts (not shown). The set up in FIG. 2 is intended for positive camber increase. Thus, the bar 20 is raised along the post 38 by adjustment of slide 44, resecured in place by screws 56, the second arm 28 is connected to the mounting plate 12, and the Porta-Power unit 30 operated to increase its extension between pins 32 and 34. The arm 28 pivots about pin 29, as the first arm 24 remains immovable, resulting in bending of the trailing arm 16 along its length as the mounting plate is moved angularly, the trailing arm being restrained from moving with the mounting plate by the weight of the vehicle (not shown) attached to it.

With reference now to FIG. 3, a McPherson strut, indicated at 18, is permanently flexed a desired degree, to correspondingly correct the camber of the wheel plate 12, using the present tool 10 modified to have a relatively shorter pivoted arm 281 without terminal aperturing in contrast to the arm 28 in FIGS. 1 and 2. In FIG. 3, the tubular element to be adjusted is the strut 18. The strut 18 is coupled to a vehicle, (not shown) as a counterforce to the corrective force to be exerted against the strut. The wheel adjacent end of the strut 18 is fixed to the wheel mounting plate 12, which in turn is connected by bolts, not shown, to the ring adapter 11 which is intended to make the present tool 10 applicable to all types of bolt patterns which may be encountered. In FIG. 3, it is assumed the wheel has excessive positive camber, and a negative correction is to be applied. To do this the tool is connected as shown in FIG. 3 with the pivoted arm 281 extending downwardly from the bar 20, and the fixed arm 24 extending upwardly from the bar. A chain 62 is looped around the strut 18 and the rear of arm 24. The Porta-Power unit 30 is inserted cross-wise to the bar 20 with its ends engaging the chain bights between the arms 24 and 281. In this relation, extension of the unit 30 draws the arms 24 and 281 together, flexing the strut 18 as a result of varying the angle of the wheel mounting plate 12 to the ground plane, specifically the strut is displaced while the mounting plate is held fixed and thus the previous angular relation between the strut and plate is altered, whereby removal of the displacing force from the strut, and unfixing the plate, effects a change in the angular relationship of the plate to the ground.

In FIG. 4, a condition of excessive negative camber is assumed. The tool 10 is set up a shown, and the Porta-Power unit 30 extended increasingly between the upper portion of the strut 18 and the lower part of fixed arm 24, which it will be noted is coupled to the unit 30 intermediate its ends at pin 64 and is coupled to the post 38 by pin 48 in opening 54 to achieve the desired opposed relation of forces in the FIG. 4 set up. As will be apparent, extension of the unit 30 deflects the strut 18, while the mounting plate 12 fixed to the arm 281 is adjusted in its angular relation to the plane of the ground, effecting the desired camber correction.

Thus described, it will be apparent that the invention provides a simple, portable, easy to use in adjusted relation tool for correcting camber in tubular element controlled camber suspensions, particularly of the trailing arm and McPherson strut type. Few parts, assemblable in a variety of arrangements, enable the adjuster to handle a wide variety of situations involving camber adjustment in a practical and economic manner.

I claim:

1. Corrective adjustment tool for adjusting camber of a wheel carried on a spindle and mounting plate assembly rigidly connected to a camber controlling member such as a trailing arm or McPherson strut while attached to a vehicle, said tool comprising:
    a base defining support means supporting the tool in operating position;
    a rigid bar having in normal operating position,
        a first terminus remote to the mounting plate,
            first arm means rigidly connected to said bar first terminus at a fixed angle, and,
        a second terminus adjacent to the mounting plate,
            second arm means engageable with said mounting plate and pivotally connected to said bar second terminus to define a fulcrum relative to said mounting plate; and
    force application means engaged between said first and second arms and constructed and arranged to exert spreading or contracting force in parallel with said bar therebetween freely of pressure on said spindle to angularly vary the relative positions of said arms, whereby said mounting plate is pivoted about said fulcrum in camber controlling member bending relation against the weight of said vehicle, and camber adjusted thereby.

2. Tool according to claim 1, in which said base comprises a pedestal having a vertical post, and a bracket carried by the post in tool mounting relation in operating position.

3. Tool according to claim 1, in which said first arm means is fixed at a right angle to said bar.

4. Tool according to claim 1, in which said second arm means is pivotable to extend on either side of said bar at a desired angle.

5. Tool according to claim 1, in which said second arm means includes an adapter encircling the assembly spindle in arm means coupling relation to the assembly mounting plate.

6. Tool according to claim 1, including also a longitudinally adjustable power device defining said force application means, said arm means defining opposed seats for mounting said device between them parallel to said bar.

7. Corrective adjustment tool for adjusting camber of a wheel carried on a spindle and mounting plate assembly rigidly connected to a camber controlling member such as a trailing arm or McPherson strut while attached to a vehicle, comprising:
    a tool base comprising a triangular pedestal, a vertical post, and a bracket adjustably mounted on said post carrying said tool horizontally for application to said assembly; and a tool comprising:
    a rigid bar having in horizontal operating position,
        a first terminus remote to the mounting plate,
            first arm means rigidly connected to said bar first terminus at a fixed right angle, and,
        a second terminus adjacent to the mounting plate,
            second arm means engageable with said mounting plate and pivotally connected to said bar second terminus in laterally offset relation to define a fulcrum relative to said mounting plate; and
    force application means engaged between said first and second arms constructed and arranged to exert spreading or contracting force above or below and in parallel with said bar therebetween freely of pressure on said spindle to angularly vary the relative positions of said arms, whereby said mounting plate is pivoted away or toward said remote bar terminus about said fulcrum in camber controlling member bending relation against the weight of said vehicle, and camber adjusted negatively or positively respectively thereby.

8. Tool according to claim 7, in which said first arm means comprises a U-cross section element.

9. Tool according to claim 7, in which said bar second terminus defines a journal, said second arm means is a U-cross section element sized to overfit said bar second terminus and apertured in registration with said journal, and including also a pin coupling said bar second terminus and said second arm means element in pivoting relation to extend on either side of said bar at a desired angle.

10. Tool according to claim 9, in which said second arm means includes an adapter removably secured to said second arms means element beyond said pivot a distance defining said lateral offset for encircling the assembly spindle in arm means coupling relation to the assembly mounting plate.

* * * * *